Dec. 1, 1970

F. T. THOMPSON

3,544,846

TIME DELAY CIRCUIT FOR ELECTRIC NETWORK PROTECTION

Filed Feb. 28, 1968

WITNESSES:

INVENTOR
Francis T. Thompson

BY
ATTORNEY

United States Patent Office 3,544,846
Patented Dec. 1, 1970

---

3,544,846
TIME DELAY CIRCUIT FOR ELECTRIC NETWORK PROTECTION
Francis T. Thompson, Murrysville, Pa., assignor to Westinghouse Electric Corporation, Pittsburgh, Pa., a corporation of Pennsylvania
Filed Feb. 28, 1968, Ser. No. 708,898
Int. Cl. H01h 47/18
U.S. Cl. 317—33
18 Claims

ABSTRACT OF THE DISCLOSURE

A protecting apparatus responsive to the magnitude of current through an electric transmission line and effective to actuate a disconnect switch whereby the line is disconnected from an electrical energy source in an inversely decreasing time interval with respect to the magnitude of the line current at magnitudes of line current above a predetermined minimum magnitude; the apparatus including a solid state timing network utilizing a plurality of diodes which at lower line current magnitudes are reversedly biased and which are sequentially forwardly biased to decrease the effective impedance of a capacitor charging circuit.

CROSS REFERENCES

This application relates to subject matter similar to that shown in application Ser. No. 153,841 filed Nov. 21, 1961, abandoned in favor of continuation application Ser. No. 757,186 filed Aug. 5, 1968 for Electric Relay Systems by Nathaniel D. Tenenbaum and assigned to the same assignee as is this application.

BRIEF SUMMARY OF THE INVENTION

This invention relates generally to the timing networks of the solid state type in which a capacitor is charged from a source of energy at a controlled rate as determined by the magnitude of the impedance in series with the capacitor. More particularly the solid state timing network includes an impedance network which is responsive to the input voltage to alter the magnitude of the impedance to flow of charging current to the capacitor to provide an inverse time voltage relationship.

An object of this invention is to provide an improved solid state timing network which will provide a time-voltage curve of inverse magnitude.

A further object of this invention is to provide such a timing network which is simple and economical of manufacture.

Other objects of the invention will be apparent from the description, the drawings and the hereinafter appended claims.

BRIEF DESCRIPTION OF THE DRAWING

FIG. 1 of this application is in many respects similar to FIG. 1 of the copending application of Tenenbaum and where applicable, the same reference characters are used as were used in the Tenenbaum application.

FIG. 1 illustrates a relaying combination which is associated with an electrical system to be protected. This system may be of any type having a condition to which the relaying combination is to respond. For present purposes it will be assumed that the system is a single phase system operating at a frequency of 60 cycles per second and represented by two line conductors L1 and L2. These line conductors transmit alternating current $I_L$ from a suitable source to a load through a circuit breaker 3 having a trip coil 3T. The circuit breaker also has an auxiliary switch 3S which is open when the circuit breaker is in open condition and which is closed when the circuit is in closed condition.

Figure 1:
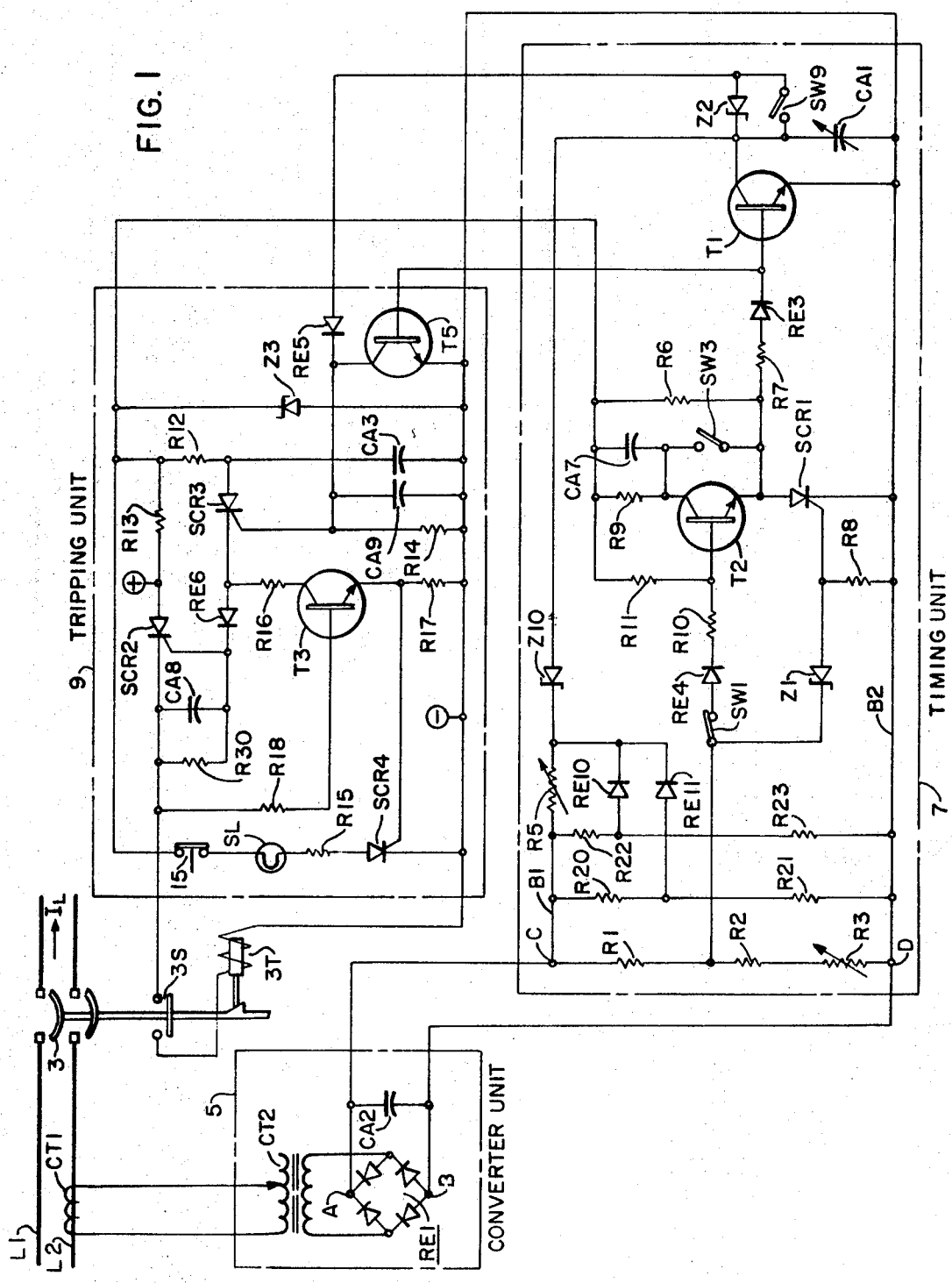
FIG. 1 illustrates schematically a protecting apparatus embodying the invention.

The circuit breaker 3 is shown in its open condition.

The relaying combination is designed to respond to a suitable condition of the electric system which is to be protected. In a preferred embodiment of the invention the relaying combination comprises an overcurrent relay which responds to the line current $I_L$ flowing through the line conductors.

The relaying combination includes a converter unit 5 which derives from the line current $I_L$ a direct voltage which is applied between the points C and D of a timing unit 7 for the purpose of controlling the charging of a storage device such as the capacitor CA1. When the voltage across the capacitor CA1 exceeds a predetermined value, a signal is applied to a tripping unit 9 for the purpose of initiating a tripping operation of the circuit breaker 3.

By inspection of the figure it will be noted that a current transformer CT1 has its primary winding energized in accordance with the line current $I_L$. The secondary winding of the current transformer CT1 is connected to the primary winding of a transformer CT2 located in the converter unit. Preferably the primary winding of the current transformer CT2 has an adjustable number of turns to facilitate adjustment of the relay combination. The secondary winding of the transformer CT2 is connected to the input terminals of a rectifier RE1. This rectifier may be of any desired construction. Preferably, it is a full-wave rectifier and is illustrated as the bridge type. The output terminals A–B of the rectifier RE1 are connected to the terminals C–D of the unit 7. A voltage divider, represented by three resistors R1, R2 and R3, is connected between busses B1 and B2 which are connected to the terminals C and D. For the purpose of calibration at least one of the resistors R1–R3, such as R3, preferably is adjustable. A filter capacitor CA2 is connected across the output terminals of rectifier RE1 for the purpose of removing ripple from the output and assuring the flow of a ripple-free direct voltage across the voltage divider.

The direct voltage appearing between the busses B1 and B2 is employed for charging a storage device such as the capacitor CA1. The charging circuit may be traced from the terminal C through a resistor R5 and a Zener diode Z10 to the common connection of the capacitor CA1, a Zener diode Z2 and the collector of a transistor T1. The other terminal of the capacitor CA1 is connected through bus B2 to the terminal D. The resistor R5 may comprise a single variable resistor or a plurality of resistors with one or more thereof variable, a plurality of resistors of fixed value arranged to have portions thereof shunted, or any other construction which provides a variable resistance. The magnitude of the resistor R5 determines, at least in part, the time required for the capacitor CA1 to reach its critical charge which will cause the Zener diode Z2 to breakover.

The capacitor CA1 is shunted by the transistor T1 which has its emitter and collector connected to its opposite terminals. The base or control circuit of the transistor T1 may be traced from the positive terminal of a source of direct voltage represented by a positive polarity marking (+) through a resistor R13, a resistor R6, a resistor R7, a rectifier RE3, the base electrode of the transistor, the emitter electrode of the transistor T1 and the bus B2 to the negative terminal of the source of direct voltage represented by a negative polarity marking (−).

At values of line current $I_L$ below which the relaying combination is to respond, the transistor T1 will be maintained conducting due to the flow of base current from the (+) terminal through the resistors R13, R6 and R7 and the diode RE3. When the line curent increases to a value at which the capacitor CA1 is to start its charging operation to determine a timing operation, a switch SCR1 closes and connects the common connection of the resistors R6 and R7 to the bus B2 to shunt the input or control circuit of the transistor T1 whereby the base drive of the transistor T1 is sufficiently reduced to render the transistor T1 non-conducting. The controlled rectifier or switch SCR1 has its anode connected to a point intermediate the resistors R6 and R7. The controlled rectifier is a cathode connected to the emitter of the transistor T1. The gate of the controlled rectifier is connected to a point intermediate the resistors R1 and R2 through a minimum voltage or transfer device which is illustrated as being in the form of a Zener diode Z1.

For low values of voltage thereacross, the minimum voltage device Z1 is in effect an insulator and blocks the flow of current therethrough: When the voltage thereacross rises above a predetermined value the device Z1 breaks over to exhibit a relatively low resistance to the flow of current. When the voltage thereacross drops below the predetermined value, the device Z1 recovers its insulating properties. In a preferred embodiment of the invention this device takes the form of a Zener diode. A resistor R8 is connected between the gate cathode of the controlled rectifier SCR1.

When current starts to flow between the anode and cathode of the silicon controlled rectifier SCR1 the gate loses control. In order to restore the gate control of the controlled rectifier, a switch is included in the output circuit of the controlled rectifier which interrupts the flow of output circuit current. In one embodiment of the invention the switch takes the form of a transistor T2 which may be similar to the transistor T1.

The transistor T2 has its emitter connected to the anode of the controlled rectifier SCR1 and has its collector connected to the positive terminal of the source of direct voltage through the resistor R9. A point intermediate the resistors R1 and R2 is connected to the base electrode of the transistor T2 through a single pole, single-throw switch SW1, a rectifier RE4 and resistor R10. In addition, the base electrode is connected to the positive terminal of the source of direct voltage through the resistors R11 and R13.

It will be assumed that the line current $I_L$ flowing is too small to result in a turn on of the transistor T2 and the controlled rectifier SCR1. Because of the current flowing from the positive terminal through the resistor R13, the resistor R6, the resistor R7, the rectifier RE3, the base electrode and emitter electrode of the transistor T1 to the negative terminal of a source of direct voltage, the transistor T1 is turned on and establishes a low resistance path across the capacitor CA1. Consequently, the capacitor CA1 is maintained in a discharged condition.

When the line current $I_L$ increases until it reaches a fault value, the potential of the common terminal between the resistor R1 and R2 will have increased sufficiently so that the voltage will breakover the Zener diode Z1 and the controlled rectifier SCR1 will be placed in a conducting condition. The internal impedance of the controlled rectifier SCR1 is related with respect to the impedance of the resistor R7 and forward impedance of the rectifier RE3 such that little if any base current flows in the tansistor T1 and the transistor T1 thereby blocks to remove the shunting circuit around the capacitor CA1. With the shunting circuit so removed, the current flowing from the terminal C through the resistor R5, the Zener diode Z10 back to the terminal D through the capacitor CA1 causes a capacitor to commence charging.

Assuming that the potential between the terminals C and D does not reach a value sufficient to bring any of the common connections of the resistor network (R20–R21 and R22–R23) positive with respect to the common connection of the resistor R5 and the Zener Z10 (as will be discussed in detail below), the capacitor CA1 will continue to charge at a rate determined primarily by the resistor R5. When the voltage across the capacitor increases to its critical value, the Zener diode Z2 will breakover. When the Zener diode Z2 breaks over, a control signal is transmitted to the tripping unit 9 which results in an energization of the trip winding 3T of the trip relay 3 whereby the relay 3 opens its main contacts in the lines L1 and L2 and its auxiliary switch 3S in a manner which will be described more completely below.

Let us consider the condition in which the line current $I_L$ dropped before the capacitor CA1 became charged sufficiently to result in a breakdown of the Zener diode Z2. Such a drop in line current reduces the voltage across the Zener diode Z1 below its breakover value and it is restored to its blocking condition. However, since the gate of the controlled rectifier SCR1 has lost control of the current flow between the anode and cathode electrodes, the interruption of current through the Zener diode does not interrupt the current in the output circuit of the controlled rectifier SCR1.

Such a drop in line current $I_L$ below the fault magnitude reduces the base drive current through the resistor R10 sufficiently, to turn off the transistor T2. The resistor R11 limits current flow therethrough to an exceedingly small value which is insufficient in itself to maintain the transistor T2 in a conductive condition. The turn off of the transistor T2 interrupts the flow of current in the output circuit of the controlled rectifier SCR1 and since the magnitude of the resistance of the resistor R6 is sufficiently great so that the minimum holding current required to maintain the controlled rectifier SCR1 conductive cannot flow therethrough due to the voltage established by the Zener diode Z3 located in the tripping unit 9, the controlled rectifier SCR1 is restored to its non-conducting conditions in which it is controlled by its gate.

Insomuch as the controlled rectifier SCR1 is in a blocked condition, current flows through the circuit represented by the resistors R13, R6 and R7, rectifier RE3 and the base emitter electrodes of the transistor T1 to turn on the transistor. The transistor T1 now establishes its low resistance shunt path across the capacitor CA1 and the capacitor CA1 is rapidly discharged through the transistor to reset the timing network.

If desired, the diode RE3 may take the form of a Zener diode which breaks over when the transistor T1 is to turn on. When the controlled rectifier SCR1 fires, the Zener diode regains its blocking condition to provide a somewhat sharper cutoff of the transistor T1.

The tripping unit 9 is energized from a source of direct voltage such as a station battery which is represented by the positive (+) and negative (−) polarity markings. The positive terminal (+) is connected through a resistor R13 to one terminal of a Zener diode Z3 which has its other terminal connected to the negative terminal (−) to provide a regulated source of voltage for the timing unit 7 and for charging a capacitor CA3 which is connected thereto through a resistor R12. With this arrangement the resistor R12 limits the flow of charging current to the capacitor CA3 which after a short interval reaches the fully charged conditions.

A trip coil 3T of the circuit breaker 3 is connected across the source of direct voltage through the auxiliary switch 3S and a control switch SCR2 which is closed when the circuit breaker is to be tripped. Preferably the switch SCR2 is a silicon controlled rectifier similar to the controlled rectifier SCR1. The output of the controlled rectifier SCR2 may be traced from the positive terminal (+) through the anode and cathode of the controlled rectifier SCR2, the auxiliary switch 3S and the trip coil 3T to the negative terminal (−). The rectifier or switch SCR2 is rendered conducting by energizing a network comprising a resistor R30 and a capacitor CA8 connected in parallel and connected between the gate and cathode thereof. When the controlled rectifier SCR2 is to be fired, a switch SCR3 is closed which causes the capacitor CA3 to discharge through the network (R30–CA8). This discharge circuit for the capacitor CA3 may be traced from the upper terminal of the capacitor through the switch SCR3, the rectifier RE6, the network (R30–CA8), the auxiliary switch 3S and the trip coil 3T to the lower terminal of the capacitor CA3. Sufficient current passes through this circuit to produce a voltage across the network (R30–CA8) to fire the controlled rectifier SCR2 whereby the trip coil 3T is connected to the source of direct voltage to assure tripping of the circuit breaker. The magnitude of the resistance R12 is sufficiently great to limit the current therethrough to a value less than the holding current magnitude of the switch SCR3.

A control network comprising parallelly connected capacitor CA9 and resistor R14 is connected between the gate and cathode of the controlled rectifier SCR3. This network (R14–CA9) is connected to be energized from the timing unit 7 through the rectifier RE5 when the Zener diode Z2 conducts. The capacitor CA9 across the resistor R14 assures a slight time delay in the firing of the controlled rectifier SCR3 and prevents firing of the controlled rectifier by brief transients. A transistor T5 has its collector and emitter connected respectively to the terminals of the capacitor CA9. The base of this transistor is connected to the base of the transistor T1. Consequently, when the transistor T1 turns on to discharge the capacitor CA1 the transistor T5 turns on to discharge capacitor CA9. When the transistor T1 turns off to permit a timing operation of the transistor T5 the transistor T5 also turns off to place the controlled rectifier SCR3 in effective condition.

In order to signal a tripping operation of the circuit breaker 3, a suitable signal lamp SL is provided. The lamp SL is illuminated by closure of the switch SCR4 which preferably is a silicon controlled rectifier similar to the rectifier SCR1. When the controlled rectifier SCR4 fires it completes an energizing circuit for the lamp SL through the normally closed switch 15, resistor R15 and the anode cathode of the controlled rectifier SCR4. Because of the discontinuous control nature of the rectifier SCR4 lamp SL will remain energized until reset by opening of the switch 15.

The controlled rectifier SCR4 is fired as a consequence of the conduction of a transistor T3 and the consequent energization of the resistor R17. This requires conduction of both of the controlled rectifiers SCR2 and SCR3. The conduction of the controlled rectifier SCR3 energizes the collector circuit of the transistor T3 which extends from the cathode of the rectifier SCR3 through the resistors R16 and R17 while energization of the controlled rectifier SCR2 causes base current through the resistor R18. It will be appreciated that due to the presence of the rectifier R6, the collector circuit of the transistor T3 is isolated from the potential established at the output of the silicon controlled rectifier SCR2.

The magnitude of the impedance offered by the resistor R5 may be altered in a predetermined manner as a function of the voltage applied between the terminals CD by means of the network comprising the resistors R20, R21, R22, R23 and the rectifiers RE10 and RE11. More specifically, the resistors R20 and R21 are connected in series between the terminals C and D and the common connection of the resistors R20 and R21 is connected through the rectifier RE11 to the common connection between the resistor R5 and the Zener diode Z10. Similarly the resistors R22 and R23 are connected in series between the terminals C and D and their common connection is connected through the rectifier RE10 to the common connection between the resistor R5 and the Zener diode Z10. As many of these resistor diode combinations may be used as is desirable to provide the shaping of an inverse time current characteristic. Two only have been shown since it is believed that this is a sufficient showing to illustrate the invention.

The various sets of series connected resistors are arranged such that their common terminals, at minimum current flow through the resistor R5 to the capacitor CA1 through the Zener diode Z10, will be negative with respect to the potential of the common terminal of the resistor R5 and the Zener diode Z10. The degree to which these individual common connections are biased negative vary. Therefore, as the potential between the terminals C–D increases, these common connections will sequentially become positive with respect to the connection between the resistor R5 and the Zener Z10 and the diodes connected between these common connections will sequentially begin to conduct. This arrangement provides shunting circuits around the resistor R5 and thereby vary the impedance to the flow of charging current to the capacitor CA1.

Figure 2:
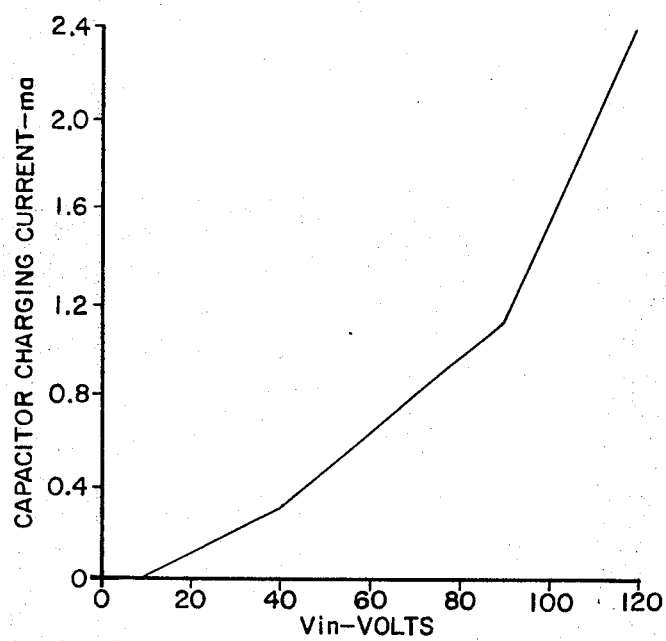
FIGS. 2 and 3 are curves illustrating the operation of the timing network.
Figure 3:
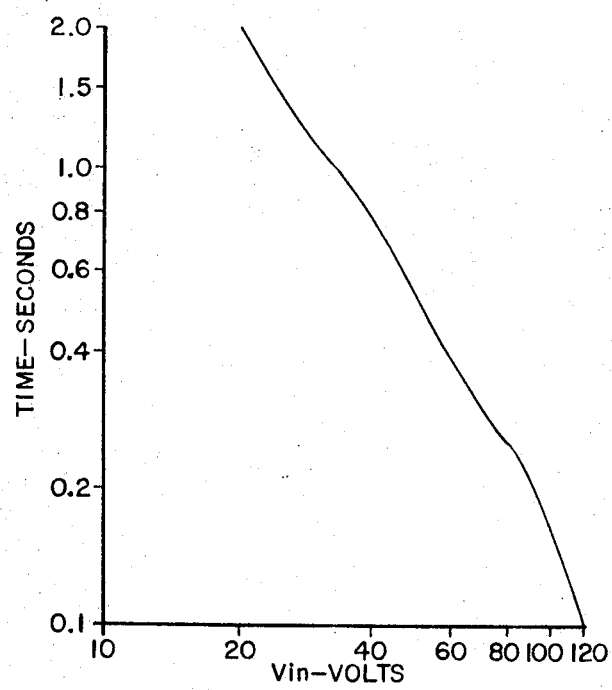

FIGS. 2 and 3 illustrate plots of the relationship between the input voltage and the charging current and the input voltage and the time required for the capacitor to obtain a critical charge when two pairs of resistor networks R20–R21 and R22–R23 are used.

The illustrated curves were obtained with the element values as follows:

R5—100K
R20—35.7K
R21—3.01K
R22—150K
R23—30.1K
RE11—type 1N457
RE10—type 1N457
Z10—type 1N957B (6.8 volt breakover)
CA1—200µf.

It will be noted that below approximately 40 volts between the terminals C and D all of the charging current to the capacitor CA1 flowed through the resistor R5. From approximately 40 volts to approximately 90 volts the magnitude of the potential of the common connection between the resistors R22 and R23 is positive with respect to the potential of the common connection between the resistor R5 and the Zener diode Z10 and a shunting circuit is provided around a resistor R5 through the resistor R22 and the rectifier R10. This decreased the effective resistance in the charging circuit of the capacitor CA1 resulting in an increase in the slope of the curve (FIG. 2) between approximately 40 and 90 volts input. At about 90 volts and above the potential of the common connection between the resistor R20 and R21 is positively biased with respect to the common connection of the resistor R5 and Zener diode Z10 and a second shunting circuit is provided around the resistor R5 through the resistor R20 and the rectifier RE11. This further decreased the effective resistance in the charging circuit and resulted in a further increase of the slope of the curve (FIG. 2).

FIG. 3 is a plot of the input voltage against the time in seconds required to raise the potential of the capacitor CA1 to the critical potential at which the Zener diode Z2 breaks over.

Figure 4:
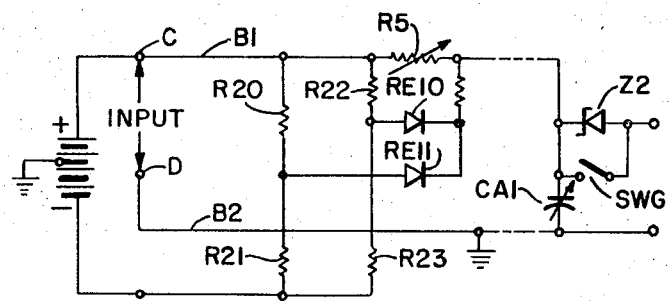
FIG. 4 illustrates schematically a modified form of the invention.

In the modification of FIG. 4, the voltage variable impedance network, like reference characters are used to designate like parts of FIG. 1. In this form of the invention, the series connected resistors R20–R21 and R22–R23 are connected across a battery which has a grounded intermediate connection and the magnitudes of the resistors are chosen such that the common connections are at different potentials below ground potential and the diodes RE10 and RE11 are reversedly biased. With increase in the input potential across terminals C and D one and then the other of the common connection will become positive with respect to the common connection of the resistor R5 and capacitor CA1 to sequentially forwardly bias the diodes RE11 and RE10 to provide first and second changes in the magnitude of the charging impedance of the capacitor CA1 substantially as described in connection with FIG. 1.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed and is desired to be secured by United States Letters Patent is as follows:

1. In a protective apparatus, a pair of input terminals adapted to be energized by an electrical control quantity of varying magnitude, a storage device, a first current limiting device, a bias voltage establishing device, a first circuit connecting said storage device between said terminals and including said current limiting device and said bias voltage device for supply of energy to said storage device in a first polarity, said bias voltage device being polarized to oppose the flow of charging current to said storage device, a second current limiting device, an asymmetric device having a low impedance to current flow in a forward direction when energized with a forward polarity and a higher impedance to current flow in a reverse direction when energized with a reverse polarity, a second circuit connecting said storage device between said terminals in shunt with said first current limiting device and including said second current limiting device and said asymmetric device, said asymmetric device being arranged to conduct in its forward direction to charge said storage device in said first polarity, and means connected to said asymmetric device for establishing said reverse potential across said asymmetric device when the magnitude of the potential between said input terminals is below a predetermined magnitude.

2. The combination of claim 1 in which said bias voltage device is connected between one terminal of said storage device and one terminal of said asymmetric device.

3. The combination of claim 2 in which said one terminal of said asymmetric device is the terminal thereof which is positive with respect to the other terminal of said asymmetric device when said asymmetric device is energized with said forward polarity and said one terminal of said storage device is negative with respect to the other terminal thereof when said storage device is changed to its said first polarity.

4. The combination of claim 3 in which said bias producing source is energized from a potential source separate from said quantity which is supplied to said input terminals.

5. The combination of claim 2 in which said one terminal of said asymmetric device is the terminal thereof which is negative with respect to the other terminal of said asymmetric device when said asymmetric device is energized with said forward polarity and said one terminal of said storage device is positive with respect to the other terminal thereof when said storage device is changed to its said first polarity.

6. The combination of claim 5 in which said bias producing source comprises an impedance means which establishes a substantially constant potential thereacross irrespective of the magnitude of current flow therethrough.

7. A timing network having an inverse time characteristic comprising, a pair of input terminals adapted to be energized by an electrical control quantity of indeterminate magnitude, an electrical energy storage device, an impedance means, an asymmetric current flow device, a bias voltage producing device, a first circuit connecting said storage device between said input terminals through said impedance means and including said bias device, a voltage dividing network having electrically spaced terminals connected to said input terminals and having an intermediate terminal, a second circuit connecting said intermediate terminal to a point in said first circuit which is located intermediate said impedance means and said storage device and including said current flow device.

8. The combination of claim 7 in which said asymmetric devices are rectifiers.

9. The combination of claim 7 in which said bias device comprises an impedance means which establishes a substantially constant potential thereacross irrespective of the magnitude of current flow therethrough, said storage device is a capacitor, said asymmetric device is a rectifier, and said impedance means is a resistor.

10. The combination of claim 9 in which said voltage dividing network includes a pair of series connected resistive portions, said intermediate terminal being the common connections between said resistive portions.

11. The combination of claim 7 in which there is provided a plurality of said dividing networks and a plurality of said rectifiers and an individual said second circuit individually connecting each of said dividing networks to said first circuit, each said network having its said intermediate terminal at a different potential with respect to one of said input terminals when said input terminals are energized with a first potential.

12. A timing network having an inverse time characteristic comprising, a pair of input terminals adapted to be energized by an electrical control quantity of indeterminate magnitude, an electrical energy storage device, an impedance means, an asymmetric current flow device, a first circuit connecting said storage device between said input terminals through said impedance means, a voltage dividing network having electrically spaced terminals connected to said input terminals and having an intermediate terminal, a second circuit connecting said intermediate terminal to a point in said first circuit which is located intermediate said impedance means and said storage device and including said current flow device.

13. The combination of claim 12 in which said voltage dividing network comprises an impedance and in which its said impedance is connected in series with said asymmetric flow device and in shunt circuit with said first named impedance means.

14. A timing network having a non-linear time characteristic comprising, a first pair of input terminals adapted to be energized by an electrical control quantity of indeterminate magnitude, an energizable circuit having input terminals and including an electrical energy storage device, first and second current conducting means, each said conducting means establishing a voltage thereacross which varies with the magnitude of the current flow therethrough, a first circuit connecting said energizable circuit between said input terminals and connecting said first current device between one of said first pair of input terminals and one of said input terminals of said energizable circuit, a second circuit connecting said second current conducting device in shunt with said first current conducting device and in series with said energizable circuit between said first pair of input terminals, current flow controlling means controlling the conductive condition of said second circuit as a joint function of the magnitude of a bias voltage and of the magnitude of the voltage established by said first conducting means.

15. The combination of claim 14 in which said bias voltage is derived from the control quantity supplied to said first pair of input terminals.

16. The combination of claim 14 in which said first circuit connects said first current conducting means between one of said first pair of input terminals and one of said second pair of input terminals, said second circuit connects said second current conducting means between said one input terminal and connects said current flow controlling means intermediate said second current conducting means and said one terminal of said second pair of terminals, and in which said energizable circuit includes means for maintaining at least a predetermined minimum potential between said second pair of input terminals.

17. The combination of claim 16 in which said current flow controlling means includes a connection between the other of said first pair of input terminals and a point in said second circuit which is intermediate said second conducting means and said current flow controlling means.

18. The combination of claim 17 in which said connection includes a first impedance element, said first and said second current conducting means each include an impedance element, said first impedance element and said impedance element of said second current conducting means being so related to said predetermined minimum potential that the potential at said one input terminal of said energizable circuit is at a positive potential with respect to said point in said second circuit, and said current flow controlling means is a rectifying device.

References Cited
UNITED STATES PATENTS 3,105,920   10/1963   Dewey      317—36
3,440,491   4/1969   Tenenbaum et al.    317—36X JAMES D. TRAMMELL, Primary Examiner U.S. Cl. X.R.

317—36, 49, 142; 320—1